United States Patent [19]

Gierer

[11] Patent Number: 4,981,052
[45] Date of Patent: Jan. 1, 1991

[54] TRANSMISSION CONTROL FAIL SAFE SYSTEM

[75] Inventor: Georg Gierer, Kressbronn, Fed. Rep. of Germany

[73] Assignee: Zahnradfabrik Friedrichshafen AG, Friedrichshafen, Fed. Rep. of Germany

[21] Appl. No.: 328,080
[22] PCT Filed: Aug. 1, 1987
[86] PCT No.: PCT/EP87/00423
§ 371 Date: Feb. 7, 1989
§ 102(e) Date: Feb. 7, 1989
[87] PCT Pub. No.: WO88/01029
PCT Pub. Date: Feb. 11, 1988

[30] Foreign Application Priority Data

Aug. 8, 1986 [LU] Luxembourg ............... 00469

[51] Int. Cl.⁵ .......................................... B60K 41/18
[52] U.S. Cl. ...................................................... 74/866
[58] Field of Search .................. 74/861, 866, 867, 868, 74/869

[56] References Cited

U.S. PATENT DOCUMENTS

| | | | |
|---|---|---|---|
| 3,937,108 | 2/1976 | Will | 74/866 |
| 4,494,423 | 1/1985 | McCarthy et al. | 74/867 X |
| 4,628,772 | 12/1986 | Nishikawa et al. | 74/868 X |
| 4,635,508 | 1/1987 | Tatsumi | 74/866 |
| 4,827,806 | 5/1989 | Long et al. | 74/861 X |
| 4,841,816 | 6/1989 | Bullock | 74/869 X |
| 4,858,501 | 8/1989 | King | 74/867 X |

FOREIGN PATENT DOCUMENTS 1780693 5/1975 Fed. Rep. of Germany ........ 74/867

Primary Examiner—Dirk Wright
Attorney, Agent, or Firm—Herbert Dubno

[57] ABSTRACT

Electrohydraulic control for an automatically shiftable automotive transmission with a selection slide valve (2), at least for the neutral position (N), as well as for the drive mode (D) and reverse mode (R), an electronic control device (3) having solenoid valves (4) held in neutral position by spring action, a pressure-medium source (1), pressure control and gear control valves (5, 6, 7) for the actuation of gear engagement couplings and brakes (A-F), as well as with a R-gear safety valve (8), for preventing the shifting into the R-gear when the forward drive speed is still too high, and a system which, in the case of electronic failure, holds or shifts the automatic transmission to one gear insuring that the maximum permissible rotational speed of the engine is not exceeded when the vehicle travels at maximum speed, whereby, in the event of failure of the electronic control device (3) during driving, a control system holds or shifts the gear, and in the event of failure of the electronic control device (3) before the start or the restart of the engine, this control system (5, 6, 7, 8, 9) engages a lower gear. This way, in the case of electronic failure during travel, travel can be continued unhampered, for instance also in the highest gear, and no shifting down takes place. When the electronic device fails at start or at restart after a failure during travel, a lower gear is engaged, wherein it is also possible to start the vehicle.

14 Claims, 3 Drawing Sheets

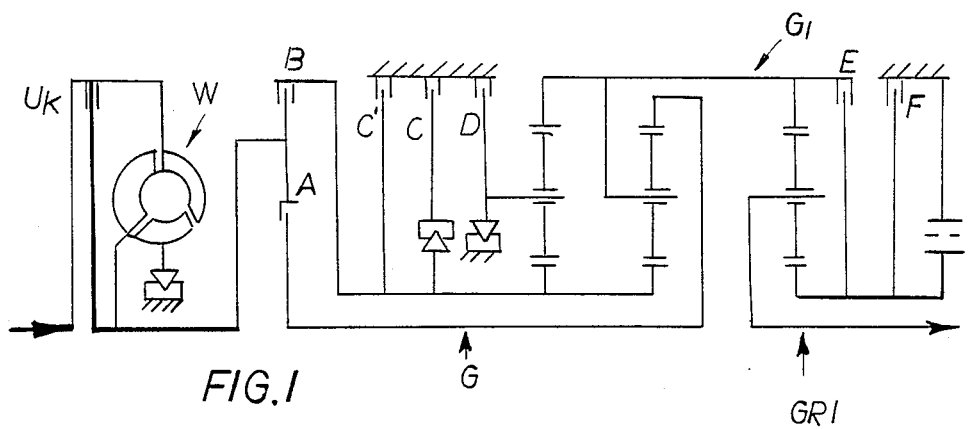
FIG.1
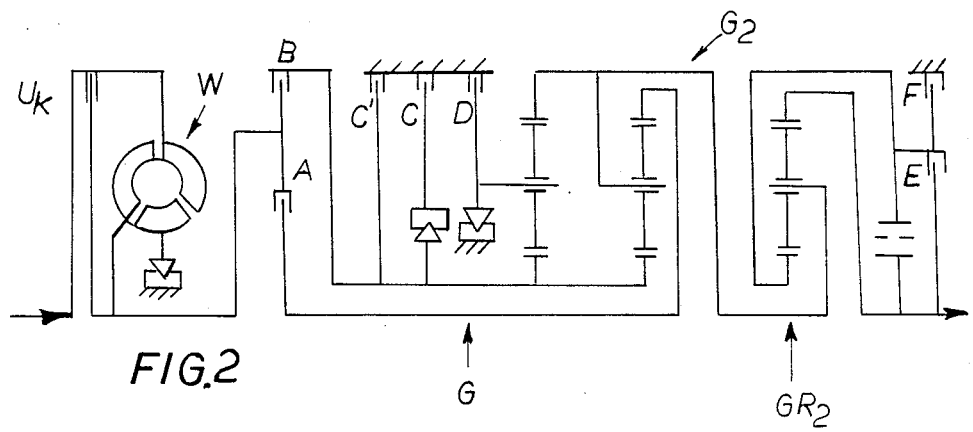
FIG.2
| SOLENOID VALVES | | CLUTCHES BRAKES | | | | | | |
|---|---|---|---|---|---|---|---|---|
| 4a | 4b | A | B | C | C' | D | E | F |
| G.1 | | • | • | | | | (•) | | • |
| G.2 | • | • | • | | • | • | | | • |
| G.3 | • | | • | • | • | | | | • |
| G.4 | | | • | • | • | | | • | |
| R. | | • | | • | | | • | • | • |
FIG.3

TRANSMISSION CONTROL FAIL SAFE SYSTEM

CROSS-REFERENCE TO RELATED APPLICATIONS

This application is a national phase application corresponding to PCT/EP87/00423 filed Aug. 1, 1987 and based in turn upon an application filed in Luxembourg as PCT/EP86/00469 filed Aug. 8, 1986 under the International convention.

FIELD OF THE INVENTION

My present invention relates to an electrohydraulic control for an automatically shiftable automotive transmission. More particularly, the invention relates to an electrohydraulic control for an automatically shiftable automotive transmission with a selection slide valve at least for the neutral position as well a for the drive mode and the reverse mode, an electronic control device, solenoid valves held in the neutral position by spring action, a pressure-medium source, pressure control valves and gear shift control valves for actuating the gear engagement clutches and brakes, a reverse-gear safety valve which prevents the shifting into the reverse gear when the forward drive speed is too high and a system which, in the event of failure in the electronic circuitry, holds or shifts the automatic transmission into a gear insuring that the maximum permissible rotational speed of the engine is not exceeded when the vehicle travels at maximum speed.

BACKGROUND OF THE INVENTION

A 4-speed automatic transmission with electronic-hydraulic control is known from two publications in ATZ 85 (1983), 6 pages 393 to 405. From paragraph 4, Transmission Control (page 402) and paragraph 5, Safety Functions, as well as from FIGS. 6 and 7 of these prior art publications, it is known that in a currentless state, the vehicle can be driven purely hydraulically, corresponding to the selection slide valve shift, either forward in the 3rd speed or in reverse, whereby a neutral position (idling setting) is also possible.

In the publication 4 HP 22 E of the ZF GETRIEBE GMBH SAARBRÜCKEN, Oil Circuit Diagrams, this electronic-hydraulic transmission is illustrated in detail and completes FIG. 6. This system is possible because it controls an overdrive transmission, wherein the 4th speed is a high-speed gear—overdrive- and the engine does not reach the highest rotational speed. However, such a control is not appropriate for a 4-speed transmission with a direct 4th speed or an overdrive transmission wherein the highest rotational speed is reached in the highest gear, because a shifting down from the 4th to the 3rd speed in case of electric-current supply failure leads to excessively high rotational speeds in the engine and could result in damage to the engine.

OBJECTS OF THE INVENTION

It is, therefore, an object of the present invention to provide an improved electronic-hydraulic control of the type described, so that in case of electric-current supply failure no unacceptable downshifting occurs.

It is also an object to achieve this result without an increase in the cost of construction.

SUMMARY OF THE INVENTION

This object is attained providing the electronic device so that the gear in which the maximum permissible rotational speed is not exceeded is held only during travel by a control system or the transmission is shifted into this gear, and during failure of the electronic control device, this system engages a lower gear before starting or restarting of the engine.

During operation at high speed, the driver does not become aware of a failure in the electronic control from the behavior of the vehicle, until the provided signal appears on the dashboard, and under such conditions he can continue to drive unimpaired. Also, the engine is not overloaded, since no inadmissible shifting down, which could lead to engine damage, takes place. Only when certain requirements can no longer be met in this speed, e.g. driving uphill, will the driver have the possibility to shift the transmission into a lower gear. However, for this purpose the system pressure has to be interrupted for a short while for the hydraulic part of the electronic-hydraulic control to respond. For safety reasons, the driver has to stop the engine for this purpose and then restart it. Of course, it would also be possible to carry out this shifting to a lower gear by shifting the selection slide valve into the neutral position and again back into drive. But, such a control system will not meet safety requirements, since the driver would have the possibility to shift when the driving speed is still too high. According to the invention, independently of the failure of the electronic control device, after the start or restart of the engine and the shifting of the selection slide valve into the reverse mode, is it possible to drive in reverse. Alternatively, independently of the failure of the electronic control device, when the selection slide valve is shifted into the R-mode, it is possible to drive in reverse.

Moreover, with a failed electronic control device after the start of the engine and by shifting the selection slide valve into the drive mode, a start in a predetermined lower drive gear is possible.

The control system is advantageously a hydraulic control system for a 4-speed automatic transmission with three gear control valves, a R-gear safety valve and a further control valve. As a control valve a safety valve is provided, and that the hydraulic control system consists of this safety valve and the available three-gear control valves, as well as of the reverse-gear safety valve. A pressure medium source is connected via a conduit which the main pressure valve, the selection slide valve and a channel for the system pressure. The selection slide valve is connected via a channel for the system pressure with the coupling for the forward drive and a fifth annular space of the 1-2 gear control valve and via a channel, which is filled with system pressure when the selection slide valve is shifted into R-gear, with a second annular space of the R-gear safety valve.

A system-pressure branch of channel leads to the pressure-reducing valve, as well as to a third annular space of the safety valve and to a fifth annular space of the 3-4 gear control valve. A reduced pressure is directed as control pressure via a control-pressure line to the solenoid valves and these are connected via an electric control line with the electronic control device.

From the first solenoid valve a first control line leads to a second annular space of the 3-4 gear control valve and to a spring space of the 1-2 gear control valve, and from the second solenoid valve a second control line leads to the first frontal annular spaces of the R-gear safety valve, the 1-2- and 2-3- gear control valves and of the safety valve, as well as to a fifth annular space of this safety valve.

All gear control valves and the R-gear safety valve and the safety valve have annular spaces, formed in their housings and a spool valve each kept in an end position by the pressure of a respective compression spring located in the respective spring spaces.

The 1-2 gear control valve has another pressure-medium connection from the third annular space via a duct and a second ball valve to the reverse-gear brake, and the sixth annular space is connected via the conduits to the fifth annular space of the 2-3 gear control valve and the second and seventh annular space have a vent. The spool valve has three control pistons for the formation of the control edges.

The 2-3 gear control valve has another pressure-medium connection from the third annular space via conduit to the brake and from the sixth annular space via a conduit, the first ball valve and a further conduit to a clutch, and over the fourth annular space via a conduit to a brake. The second and the seventh annular spaces have a vent. The spool valve has three control pistons for the formation of control edges.

The 3-4 gear control valve has another pressure-medium connection from the fourth annular space over a conduit to a further brake for the 1st to 3rd speeds and the R-gear and from the sixth annular space through the conduit to the clutch for the 4th speed. The third and seventh annular spaces have vents. The respective spool valve has four control pistons for the formation of control edges. The R-gear safety valve has another pressure-medium connection from the third annular space via a duct and a second ball valve to the R-gear brake and over a conduit and the first ball valve and a conduit to the respective clutch, and from the conduit an additional branch leads to the spring space of the safety valve. The fourth annular space has a vent and its spool valve has two pistons for the formation of control edges.

The safety valve is another pressure-medium connection from the fourth annular space over a conduit to the first frontal annular space of the 3-4 gear control valve. The second annular space has a vent and the respective spool valve has three control pistons for the formation of control edges. There is yet another pressure-medium connection from the respective conduits through a third, only unilaterally opening ball valve to the channel and thereby to the first clutch.

In the event of failure of the electronic control device during driving and the associated venting of its control lines via the system pressure channel, the safety valve is kept in its connected position and through the 3-4 gear control valve the clutch for the 4th speed is closed. Via the system-pressure channel the first clutch is directly closed and via the 1-2 gear control valve, the respective brake is closed and via the conduits, the 2-3 gear control valve and the first ball valve, the second clutch is closed.

Alternatively, in the event of failure of the electronic control device prior to starting or restarting the engine and the actuation of the selection slide valve in forward drive, the system pressure is directed to a channel through the safety valve and to the 3-4 gear control valve and displaces the same against the pressure of a spring, whereby the clutch for the 4th speed is vented and its brake is closed through the system pressure from the channel. Via the system-pressure channel, the first clutch is directly closed and via the 1-2 gear control valve and the respective conduits, the respective brake is closed. Via the 2-3 gear control valve and the first ball valve, the second clutch is closed.

A shifting of the selection slide valve in the position for the reverse mode (R), however, results in travel in this direction, although a lower gear has been selected in the drive mode range.

With the shifting of the automatic transmission into a lower gear, e.g. the 3rd speed, in a 4-speed transmission, in the case of start or restart when the electronic control has failed, it is also possible to start in the forward direction from the stationary position. By using the shift valves and control valves, which are anyway required for the hydraulic control effectuating the continuous drive and the start in forward driving and reverse driving directions in case of electronic failure without damage to the engine, the cost of construction is not increased. Solely through the unique connection of the two safety valves with the three gear control valves, this problem is solved in an electronic-hydraulic control for a 4-speed automatic transmission. Due to the multiple use of a solenoid valve, it is possible to avoid the need for an additional solenoid valve for the R-speed safety.

BRIEF DESCRIPTION OF THE DRAWING

The above and other objects, features and advantages of the present invention will become more readily apparent from the following description, reference being made to the accompanying drawing in which:

FIG. 1 is a diagram of a 4-speed automatic transmission with a direct 4th speed;

FIG. 2 is a diagram of a 4-speed automatic transmission according to FIG. 1, but with an overdrive;

FIG. 3 is a table of the activation of the clutches, brakes and solenoid valves in the individual speeds in a transmission according to FIG. 1;

SPECIFIC DESCRIPTION

The automatic transmission G1 according to FIG. 1 is driven by a driving engine (not shown) via hydrodynamic torque converter W with by-pass clutches UK and consists of a basic transmission G with the clutches A and B, as well as the brakes C', C and D and an auxiliary transmission GR 1 for the 4th speed with the clutches E and the brake F. Further, for the improvement of the shifting and control, unmarked freewheeling units are arranged in the basic transmission as well as in the auxiliary transmission.

In the automatic transmission according to FIG. 2, the arrangement of the hydrodynamic torque converter W and of the basic transmission G is the same as in FIG. 1, only the auxiliary transmission GR 2 is connected in a different way with the basic transmission G, and the clutch E and brake F are differently arranged.

From the Table according to FIG. 3, where dots represent actuated states, which applies to transmission G1 in FIG. 1, it can be easily understood which clutches and brakes A to F and solenoid valves 4a and 4b are closed in the individual speeds and are connected and disconnected by the electronic-hydraulic control, and in the case of the solenoid valves by the electronic control device 3, and with reference to the clutches and brakes, actuated with system pressure.

Figure 4:
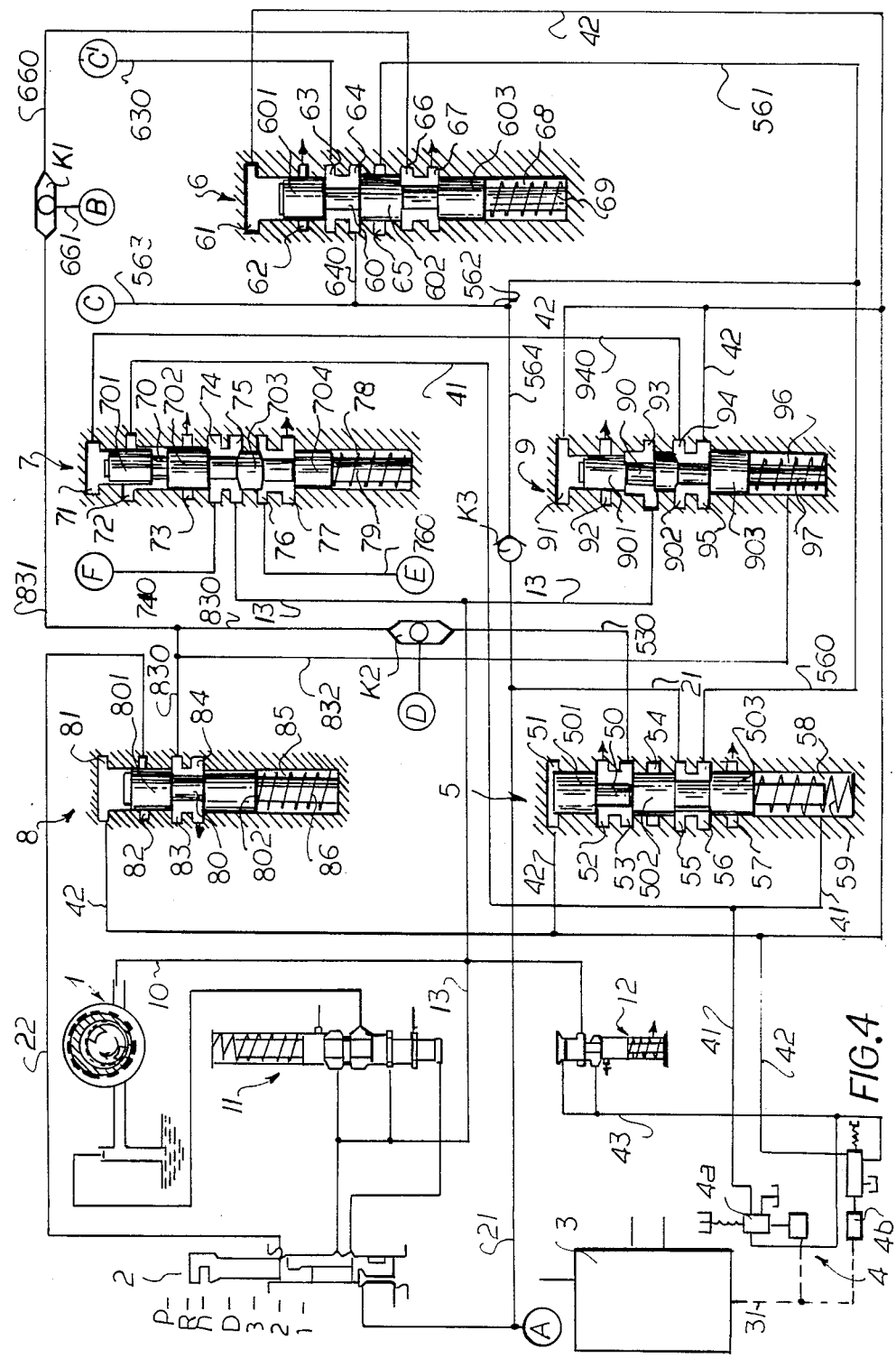
FIG. 4 is a simplified control and oil-circuit diagram.

In the simplified control diagram according to FIG. 4, a pressure-medium source 1 is connected via a conduit 10 with a main pressure valve 11, as well as with a selection slide valve 2 and the system-pressure channel 13. The selection slide valve 2 has another connection via channel 21 with the clutch A for the forward drive mode, as well as with the 5th annular space 55 of the 1-2 gear control valve 5.

Furthermore, from the selection slide valve 2, another channel 22 leads to the second annular space 82 of the reverse speed safety valve 8, which however is actuated by system pressure only when the selection slide valve is shifted into the reverse mode (R).

The system-pressure channel 13 has a branch leading to the pressure-reducing valve 12, as well as to the third annular space 93 of the safety valve 9 and to the fifth annular space 75 of the 3-4-gear control valve 7.

From the pressure-reducing valve 12, via the control-pressure line 43, the solenoid valves 4a and 4b are supplied with control pressure.

The solenoid valves 4a and 4b are switched by the electronic control device 3 via the electric control line 31 and are vented when disconnected.

From the first solenoid valve 4a, a first control line 41 leads to the second annular space 72 of the 3-4-gear control valve 7 and to the spring space 58 of the 1-2 gear control valve 5.

The second control line 42 leads from the second solenoid valve 4b to the first frontal annular spaces 51, 61, 81, 91 of the gear control valves 5, 6 and of the reverse-speed safety valve 8 and of the safety valve 9, as well as to the fifth annular space 95 of this safety valve 9.

All gear control valves 5, 6, 7, the reverse-speed safety valve 8 and the safety valve 9 have several annular spaces 51-57, 61-67, 71-77, 81-84, 91-95 worked into the housing and for each a spool valve slider 50, 60, 70, 80, 90 is provided, each being pushed into an end position by a compression spring 59, 69, 79, 86 and 97, respectively, arranged in the spring spaces 58, 68, 78, 85, 96.

The 1-2-gear control valve 5 has also a pressure-medium connection from the third annular space 53 via the duct 530 and the second ball valve K2 to the reverse-speed brake D.

The sixth annular space 56 is connected via duct 560, 561 with the fifth annular space 65 of the 2-3-gear control valve 6, and the second annular space 52 and the seventh annular space 57 have a vent, while the spool valve slider 50 has three control pistons 501, 502 and 503, forming control edges.

The 2-3-gear control valve 6 has also another pressure-medium connection from the third annular space 63 via the duct 630 to the brake C' and from the sixth annular space 66 via the duct 660, the first ball valve K1 and the duct 661 to the clutch B. Further, a duct 640 leads from the fourth annular space 64 to the brake C and the second and seventh annular spaces 62, 67 have a vent. The spool valve slider 60 has three control pistons 601, 602 and 603 for the formation of control edges.

The 3-4 gear control valve 7 has also a pressure-medium connection from the fourth annular space 74 via the conduit 740 to the brake F for the speeds 1 to 3 and the R-speed, and from the sixth annular space 76 via the conduit 760 to the clutch E for the 4th speed. The third and seventh annular spaces 73 and 77 have a vent and the spool valve slider 70 has four control pistons 701-704 for the formation of control edges, whereby the control piston 701 has a smaller diameter in comparison to the remaining control pistons.

The reverse-speed safety valve 8 has also an additional pressure-medium connection from the third annular space 83 via the conduit 830 and the second ball valve K2 to the reverse-speed brake D and via the conduit 831 and the first ball valve K1 and the conduit 661 to the clutch B. A branch 832 of the conduit 830 leads to the spring space 96 of the safety valve 9, and the fourth annular space 84 has a vent. The spool valve slider 80 has two control pistons 801 and 802 for the formation of control edges.

The safety valve 9 has another pressure-medium connection from the fourth annular space 94 via the conduit 940 to the first frontal annular space 71 of the 3-4 gear control valve 7, and the second annular space 92 has a vent. The spool valve slider 90 has also three control pistons 901-903 for forming control edges, whereby the control piston 901 has a smaller diameter than the remaining control pistons 902 and 903.

Further, there is a connection conduit 562, 564 from the conduit 560 to the conduit 640 and to the channel 21, and thereby to the clutch A. Between the connection conduit 564 and the channel 21, extra supply line to clutch A, there is a third ball valve K3, which allows only unidirectional flow passage in the described direction.

The electronic-hydraulic control device according to FIG. 4 works as follows: The electronic control device 3 is connected to the solenoid valves 4a and 4b. Further, the electronic device takes over the adjustment of the modulation pressure and the engagement of the converter-bypass clutch; both are not shown in the simplified control diagram according to FIG. 4.

When the electrohydraulic control is fully functioning, in the first speed, the solenoid valve 4b is engaged by the electronic control device 3, so that over the second control line 42 the gear control valves 5, 6 and 7 are shifted against the pressure of the springs 59, 69 and 79.

Over the channel 21 the coupling A is closed and over the channel 13 and the conduit 740 the brake F is closed. According to FIG. 3, in the 2nd speed the solenoid valve 4a is also engaged, so that via the first pressure line 41 control pressure is supplied to the spring space 58 of the 1-2-gear control valve 5 and the second annular space 72 of the 3-4 gear control valve 7. The 1-2-gear control valve 5 is thereby pushed back into its initial position. As a result, the system pressure from channel 21 can close the brake C via the annular spaces 55 and 56 and the conduits 560, 562 and 563, and can close the brake C' via the conduit 640 and the annular spaces 64 and 63 of the 2-3-gear control valve 6 as well as the conduit 630.

In the 3rd speed the solenoid valve 4b is disconnected and the second control line 42 is vented via the solenoid valve. As a result, the 2-3-gear control valve 6 goes back to its initial position, and the brake C' is vented over the conduit 630 and the annular spaces 62 and 63. At the same time, via the conduit 561 and the annular spaces 65 and 66 of the 2-3-gear control valve 6 via the conduit 660, the first ball valve K1 and the conduit 660 the coupling B is closed.

In the 4th speed, the solenoid valve 4a is also disconnected and the first control line 41 is vented. Thereby, the 3-4-gear control valve 7 goes back to its initial position, the brake F is vented via the conduit 740 and the fourth and third annular space and the clutch E is closed via the channel 13, the fifth and sixth annular space and the conduit 760. This combination makes it possible to connect without delay the gear control valves 5, 6 and 7, as desired. Also, with the solenoid valve 4b the R-gear safety valve 8 can be actuated at the same time. In this way, it is possible to save one solenoid valve.

The gear control valves 5, 6 and 7 are hydraulically locked against each other, so that no erroneous shifting, leading to the blocking or destruction of the transmission, can occur.

At the electronic recognition of the selection of position R by the selection slide valve 3 and at a limit speed, additionally to the solenoid valve 4a, also the solenoid valve 4b is connected. Via the second control line 42 the reverse-gear safety valve 8 is pushed via the annular space 81 against the force of the spring 86 and thereby the system pressure coming from the select ion slide valve 3 via the channel 22 is blocked in the second annular space. Only when the speed has decreased below the limit speed or threshold is the solenoid valve electronically disconnected and via the annular space 82 and 83 and the conduit 830 and the second ball valve K2 the reverse-mode brake D can be closed, while via the conduit 831 and the first ball valve K1, as well as the conduit 661, the clutch B can be closed.

In case of failure of the electronic control device 3 during travel and therewith connected venting of the control lines 41 and 42, the safety valve is maintained in the connected position in the annular space 93 by the system pressure from channel 13.

The 3-4-gear control valve is in the end position determined by the spring 79, so that system pressure from the channel 13 passes via the annular spaces 75 and 76 and the conduit 760 to the clutch E and closes same. Via the system-pressure channel 21 the clutch A is directly closed, and via the 1-2-gear control valve, the annular spaces 55 and 56, as well as the conduits 560, 562 and 563 the brake C is closed. Via the conduit 560, 561 and the 2-3-gear control valve 6, annular spaces 65 and 66, as well as the conduit 660 and the first ball valve K1 and the conduit 661 the coupling B is also closed. Thereby, the 4th speed is held or connected and it is possible to travel at this time only in this speed. In order to continue travelling in a lower speed or in order to start the vehicle, it is necessary first to interrupt the system pressure for a short time. For this purpose, the engine has to be turned off and then to be restarted again, since this insures that when the transmission is shifted into a lower gear, in which it is also possible to start, the rotational speed of the engine is not inadmissibly high.

When the engine is started anew, the system pressure comes via the channel 13, the annular spaces 93, 94 and the conduit 940 to the annular space 71. As a result, the 3-4-gear control valve 7 is brought into the illustrated position. When the selection slide valve is shifted from the position N (neutral), where it was started, to the position drive, the system pressure from channel 13 is guided via the annular spaces 75 and 74 and the conduit 740 to the brake F and this is closed, while the coupling E is vented via the conduit 760 and the annular spaces 76 and 77. Via the channel 21, the coupling A is directly closed by the system pressure and via the 1-2-gear control valve 5 and the conduits 560, 561, 563 the brake C is closed, via the conduit 560, 561, the 2-3-gear control valve 6, the conduit 660, ball valve K1 and the conduit 661 the coupling B is closed.

If the electronic control device 3 has failed and the selection slide valve 2 is shifted into the R-gear, the system pressure reaches via channel 22 the reverse-gear safety valve 8. Via the annular spaces 82 and 83 the conduit 830 is thereby filled and over the second ball valve K2 the reverse gear brake D is closed and over the first ball valve K1 and the conduit 661, the clutch B is closed.

At the same time, over the branch 832 of the channel 830, the system pressure is directed to the spring space 96 of the safety valve 9. Thereby, the system pressure from the channel 13 is directed via the third and fourth annular spaces 93 and 94 and the conduit 940 to the frontal first annular space 71 of the 3-4-gear control valve 7, so that over the annular spaces 75 and 74 the system pressure from the second branch of the channel 13 over the conduit 740, the brake F is closed. In this shifting position of the 3-4-gear control valve the clutch E is vented.

Figure 5:
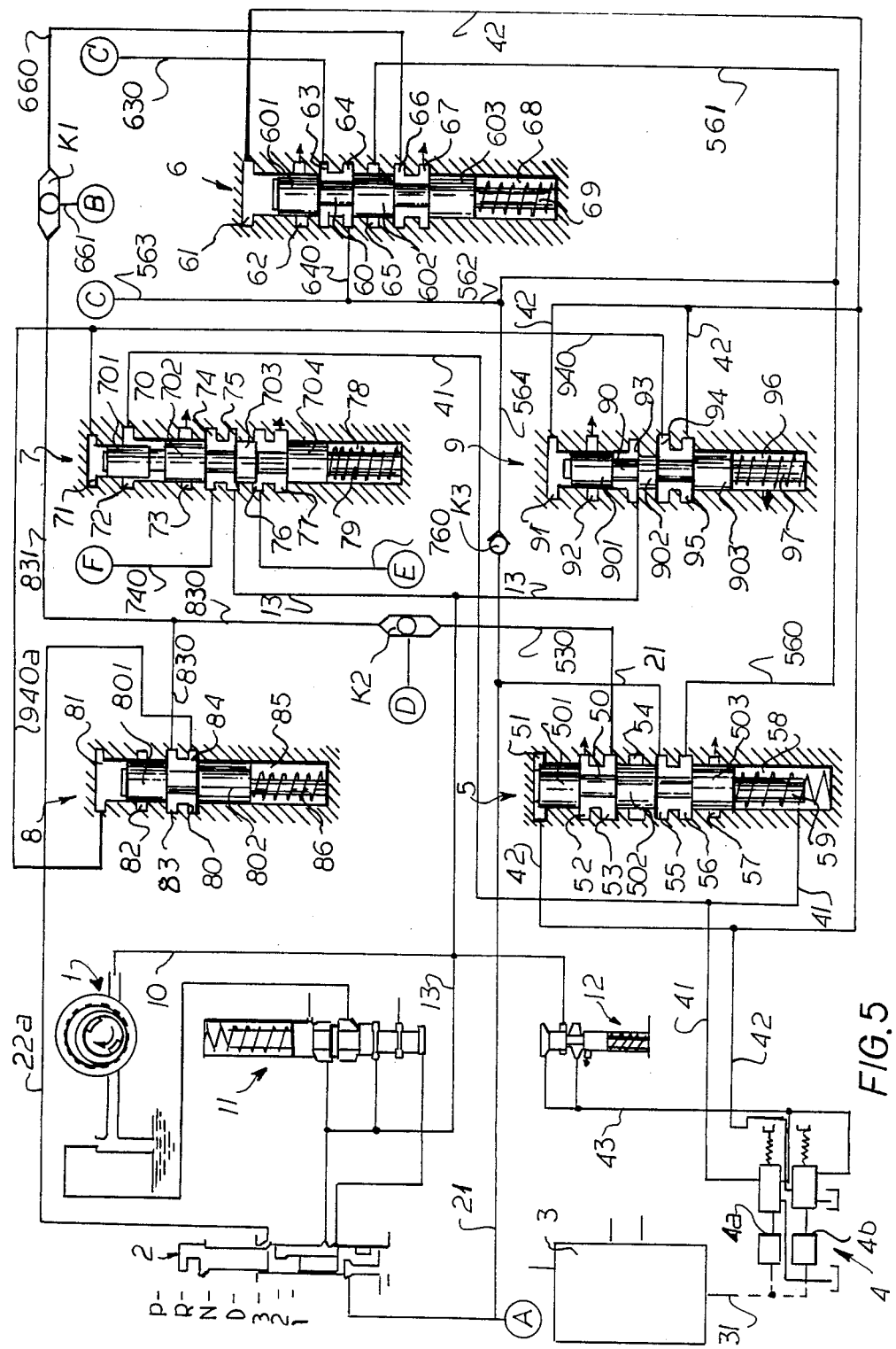
FIG. 5 is a simplified control and oil-circuit diagram of a further embodiment.

FIG. 5 is a further embodiment of the invention and is very similar to FIG. 4. Differently from FIG. 4, however, in FIG. 5 the second control line 42 does not lead to the frontal annular space 81 from the R-gear safety valve 8, and the branch 832 from the conduit 830 to the spring space 96 is also not executed. Therefore, the conduit 940 leads not only to the first frontal annular 71 of the 3-4-gear control valve 7, but further as conduit 940a to the first frontal annular space 81 of the R-gear safety valve 8, and via channel 22a, the fourth annular space 84 is connected therewith for the system pressure in the R-gear position of the selection slide valve 2, while the second annular space 82 is vented. With this variant of the channel- and conduit layout, the vehicle can be driven in reverse in the case of electronic failure, without having to interrupt the system pressure for a short time.

I claim:

1. An automatically shiftable transmission for a vehicle including a gear mechanism and having a plurality of clutches and of brakes effective to switch the gear mechanism into a respective forward and rear speeds, and an electrohydraulic control system, said electrohydraulic control system comprising:

a pressure medium source supplying a system pressure to said electrohydraulic system;

a selection slide valve receiving said system pressure from said pressure medium source for selecting between at least a forward drive mode including a first, second, third and forth forward speeds, a neutral mode and a reverse drive mode;

a first solenoid valve and a second solenoid valve operatively connected with said pressure medium source and supplying a control pressure to control shifting between said speeds, said solenoid valves having a switched off position and a switched on position corresponding to said modes selected by said selection valve;

an electronic control device for controlling said first and second solenoid valves:

a first, second and third pressure-control and gear-shift control valves for actuating the gear engagement clutches and brakes receiving said control and pressure system upon reaching the respective first, second, third and forth speeds of the transmission;

a reverse gear-shift safety valve for preventing shifting of the transmission into said reverse mode upon an output speed of the transmission exceeding a given forward output speed, said reverse-gear safety valve being hydraulically interconnected with said pressure-control and with said solenoid valves and receiving said system and control pressures; and a safety valve hydraulically interconnected with said pressure-control and reverse-gear valves and receiving said control and pressure systems, said reverse-gear, pressure-control and safety valves constituting a controlling system for holding the transmission in a respective gear upon not exceeding of the maximum permissible rotational speed or for shifting said transmission into said gear upon failure of said electronic device, said controlling system shifting said transmission into a lower gear upon starting of the engine.

2. The automatically shiftable transmission defined in claim 1, further comprising:

a main pressure-medium valve receiving said system pressure from said source;

a pressure-reducing valve receiving said system pressure from said main-pressure valve and from said source and supplying said first and second solenoid valves with said control pressure;

said first safety-control valve being a 1-2 gear selection valve formed with a spring space, a first annular space spaced from said spring space and with a second, third, forth, fifth and sixth annular spaces between said first and spring spaces;

said second safety-control valve being a 2-3 gear selection valve formed with a respective first annular space spaced from a respective spring space and with a respective second, third, forth, fifth and sixth annular spaces between said first and spring spaces of said 2-3 gear selection valve;

said third safety-control valve being a 3-4 gear-selection valve formed with a respective first annular space spaced from a spring annular space and with a respective second, third, fourth, fifth and sixth annular spaces between said first and spring spaces of said 3-4 gear control valve:

said reverse gear safety valve is formed with a respective first annular space and a respective spring space spaced from one another and with a respective second, third and forth annular spaces located between said first and spring spaces of the reverse gear valve;

said safety valve being formed with a respective first and spring annular spaces spaced from one another and with a respective second, third, forth and fifth annular spaces between said first and spring spaces of said safety valve;

said pressure-medium source being connected with said main pressure valve through a first conduit and with said manual selection valve via a second conduit, said pressure source being connected with a system-pressure channel connected with said second conduit and with said pressure reducing valve;

said selection slide valve being connected with a first clutch for the drive modes through a second conduit, said first clutch being connected with the fifth annular space of said 1-2 gear control space through a forth conduit and with a first brake by a fifth conduit, said selection slide valve being connected with the second annular space of said reverse valve through a sixth conduit, said reverse valve being actuated upon selecting said reverse move by said system pressure, the third annular space of said safety valve being in communication with said system-pressure channel through a seventh conduit and the fifth annular space of said 3-4 gear valve being connected with said system-pressure channel through an eighth conduit;

said first and second solenoid valves being connected with pressure-reducing valve through respective ninth and tenth conduits, said ninth conduit being connected with an eleventh conduit connecting said first solenoid valve with the second annular space of said 3-4 gear control valve and with a twelfth conduit leading to the spring space of said of 1-2 gear valve, said tenth conduit being connected with thirteenth, fourteenth, fifteenth and sixteenth conduits leading respectively to the first annular spaces of said 1-2, through said safety valve, via 2-3 and reverse valves and with a seventeenth conduit leading to the fourth annular space of the safety valve;

the third annular space of said 1-2 gear valve being connected with a reverse-speed brake by an eighteenth conduit, the sixth annular space of said 1-2 gear valve being connected with the fifth annular space of 2-3 gear valve through a nineteenth conduit, the second and seventh annular spaces of said 1-2 gear valve being provided with respective vents;

the third annular space of said 2-3 valve having a connection with a second brake through a twentieth conduit;

a second clutch being connected through a twenty first conduit with a first ball valve therein with the sixth annular space of said 2-3 gear valve, a twenty second conduit leading from the fourth annular space of said 2-3 valve to said first brake:

the third annular space of said 3-4 valve being connected with a third brake for said first, second, third and reverse speeds through a twenty third conduit, a twenty fourth conduit leading from the sixth annular space of said 3-4 valve to a third clutch for the fourth speed;

the third annular space of said reverse valve being connected with said reverse-speed brake through a twenty sixth conduit and through a second ball valve, said reverse-speed brake being connected with said second clutch through a twenty seventh conduit, said third annular space of the reverse valve being connected with the spring space of said safety valve via a thirty first conduit;

the fourth annular space of said safety valve being connected with the first annular space of 3-4 valve through a twenty eighth conduit;

the fourth space of said 2-3 valve being connected with said nineteenth conduit through thirtieth conduit and with said selection valve and said first clutch by said third conduit, said third conduit being provided with a one way third ball valve.

3. The automatically shiftable transmission defined in claim 2 wherein said safety valve is provided with three axially movable control pistons and having a spring located in said spring space, said safety valve having an engaged position upon moving said pistons toward said spring space, so that said spring is compressed, said safety valve being held in said engaged position upon failure of said solenoid valves by receiving said system pressure in the third annular space of said safety valve through said system pressure channel and the seventh conduit, said third clutch for the fourth speed being closed by said system pressure through said twenty fourth conduit of said 3-4 valve, said first clutch being closed upon the system pressure through said third conduit, said first brake being closed by said system pressure supplied through 1-2 valve, nineteenth, twenty ninth and via fifth conduits, said second clutch being engaged upon said system pressure through said 1-2 valve, nineteenth conduit, 2-3 valve and twenty first conduit, so that said fourth speed is hold.

4. The automatically shiftable transmission defined in claim 2 wherein said system pressure is directed to said 3-4 valve through said pressure system channel, safety valve and twenty fifth conduit for displacing pistons provided in said 3-4 valve against a pressure of a respective spring provided in the spring space of said 3-4 valve, so that said system pressure coming through said system pressure channel closes said third brake upon venting said third clutch and closes said first clutch through said third conduit and said first brake through said nineteenth, twenty ninth and fifth conduits, said second clutch being closed through said nineteenth conduit, 2-3 valve and through twenty first conduit and through said second ball valve, so that said first forward speed is turned on upon failure of said solenoid valves prior to starting the engine and the actuation of said selection valve in said forward mode.

5. The automatically shiftable transmission defined in claim 2 wherein said system pressure is supplied through said sixth conduit, said reverse valve and through said twenty fifth conduit and via said second ball valve to said rear brake, so that said rear brake is closed, said system pressure supplying through said twenty seventh conduit and via said first ball valve to said second clutch thereby closing said second clutch, said brake for the fourth speed being closed by said system pressure coming through said third annular space of said rear valve via said thirty first conduit to the spring space of said safety valve, said pistons of the safety valve being pushed towards the respective first space, so that said system pressure from said system pressure channel through said twenty eighth conduit is led to said second annular space of said 3-4 valve closing said third brake and venting said third clutch thereby driving the vehicle in reverse regardless of failure of said solenoid valves and upon shifting said selection valve in said reverse mode.

6. An automatically shiftable transmission for a vehicle including a gear mechanism and having a plurality of clutches effective to switch the gear mechanism into a respective forward and rear speeds, and an electrohydraulic control system, said electrohydraulic system comprising:
a pressure medium source supplying a system pressure to said system;
a manual valve receiving said system pressure from said source and selecting a forward drive mode including at least a first speed, a second speed, a third speed and a fourth speed, a neutral mode and a reverse mode;
electronic means connected with said manual valve for determining the respective output speed of the transmission and including a first and second solenoid valves, said solenoid valves supplying a control pressure to control shifting between said speeds, said first solenoid valve being switched on in said first speed of said manual valve;
a plurality of hydraulic switch valves receiving said system and control pressures for controlling actuation the respective clutches upon reaching the respective forward speed of the transmission;
a reverse-gear valve receiving said system and control pressures and hydraulically connected with one of said switch valves actuating the respective clutch upon said first forward speed, said reverse-gear valve preventing the shifting of the gear mechanism into said reverse mode upon the output speed of the transmission exceeding a given speed; and
a safety valve hydraulically interconnected with said switch and reverse-gear valves., said safety valve maintaining the fourth speed upon discontinuing of the control pressure supply, said safety valve, said reverse and switch valves hydraulically controlling the subsequent actuation of said clutches in response to the change of said system pressure upon failure of said electronic means and upon a start of an engine.

7. The automatically shiftable transmission defined in claim 6 wherein said control system provides said reverse mode upon the failure of said electronic means.

8. The automatically shiftable transmission defined in claim 6 wherein said control system provides an engine with a start at said first speed by controlling the engagement of the respective clutch.

9. The automatically shiftable transmission defined in claim 6 wherein said switch, reverse and safety valves constitute a hydraulic control system.

10. The automatically shiftable transmission defined in claim 6 wherein said plurality of the switch valves are;
a 1-2 gear-selection valve formed with a respective first, second, third, fourth, fifth, sixth and spring annular spaces,
a 2-3 gear selection valve formed with a respective first, second, third, fourth, fifth, sixth and spring annular spaces,
a 3-4 gear selection valve being formed with a first, second, third, fourth, fifth, sixth and spring annular spaces, each of said gear selection, reverse and safety valves being formed with a respective spring braced against a respective slide valve provided with a plurality of pistons, the respective slide being axially movable in each of said valves, the fourth space of said 1-2 valve being connected with the first clutch through system pressure lines upon shifting said manual valve in said forward drive mode and, the second annular space of said 1-2 valve being connected through the pressure lines with said reverse valve upon shifting said manual valve to said reverse mode;
said manual valve being connected by an input pressure line with said source, said input pressure line being operatively connected with the third annular space of said safety valve and with the fifth annular space of said 3-4 gear selection valve, the second annular space of said 3-4 gear selection valve receiving said control pressure from the first solenoid valve, a respective spring space of said 1-2 gear selection valve receiving said control pressure through a first control line;
said second solenoid valve supplying the first annular space of said valves spaced axially from the respective spring space and the fifth space of said safety valve with said control pressure through a second control line, the third annular space of said 1-2 gear control valve being connected to a reverse brake through said system pressure lines, the sixth annular space of the 1-2 gear valve being connected to the fifth annular space of the 2-3 gear valve by said system pressure lines;

said 2-3 gear control valve being connected with a second brake by its third annular space via said pressure system lines and by the sixth annular space thereof with the second clutch, the fourth annular space of said 2-3 gear valve being connected with a first brake;

the fourth annular space of said 3-4 gear valve being connected with a third brake by said pressure system lines and with a respective gear, the sixth annular space of the 3-4 gear valve being connected with the respective clutch for the fourth speed, the slide valve of said 3-4 valve being provided with four pistons, said reverse valve being connected with said second clutch and with said reverse-gear brake through the system pressure lines, the spring space of said safety valve being connected with the third annular space of said reverse valve, the respective slide valve of said reverse valve being formed with two pistons, the fourth annular space of said safety valve being connected with a first annular space of said 3-4 valve spaced from the respective spring space of the 3-4 valve by the system pressure lines, the fourth annular space of the 2-3 gear valve being connected with the first clutch by system pressure lines through a first unilaterally opening ball valve.

11. The automatically shiftable transmission defined in claim 10, further comprises a second ball valve connected with said second clutch and a third ball valve connected with said reverse-gear brake.

12. The automatically shiftable transmission defined in claim 10 wherein said safety valve operatively connected with the respective clutch for the fourth speed and with the said first and second clutches thereby keeping said clutches engaged and maintaining the fourth speed upon failure of the solenoid valves supplying the control system with the control pressure.

13. The automatically shiftable transmission defined in claim 10 wherein said system pressure being conveyed by said input pressure line through said safety valve to the 3-4 gear control valve upon selecting the drive mode by said manual valve and upon starting the engine, the respective slide valve of said 3-4 gear valve being displaced so, that a brake controlling the fourth speed is engaged and the clutch for the fourth speed is vented, the first clutch being engaged through said manual valve and the second clutch being engaged through the 2-3 gear control valve, so that said transmission is able to be shifted gradually from the first speed to the fourth speed upon the failure of the solenoid valves.

14. The automatically shiftable transmission defined in claim 10 wherein said system pressure is conveyed through said reverse valve to the reverse-gear brake upon shifting said manual valve in the reverse mode, so that said reverse-gear brake is engaged, said pressure system being led through said safety valve to said third brake thereby venting said clutch for the fourth speed, so that the reverse mode is controlled upon the failure of the solenoid valves.

* * * * *